Oct. 11, 1966  G. JOHANNES  3,278,362
APPARATUS FOR CURVING A BUILT-UP TIRE BODY TO SHAPE
Filed Sept. 28, 1964
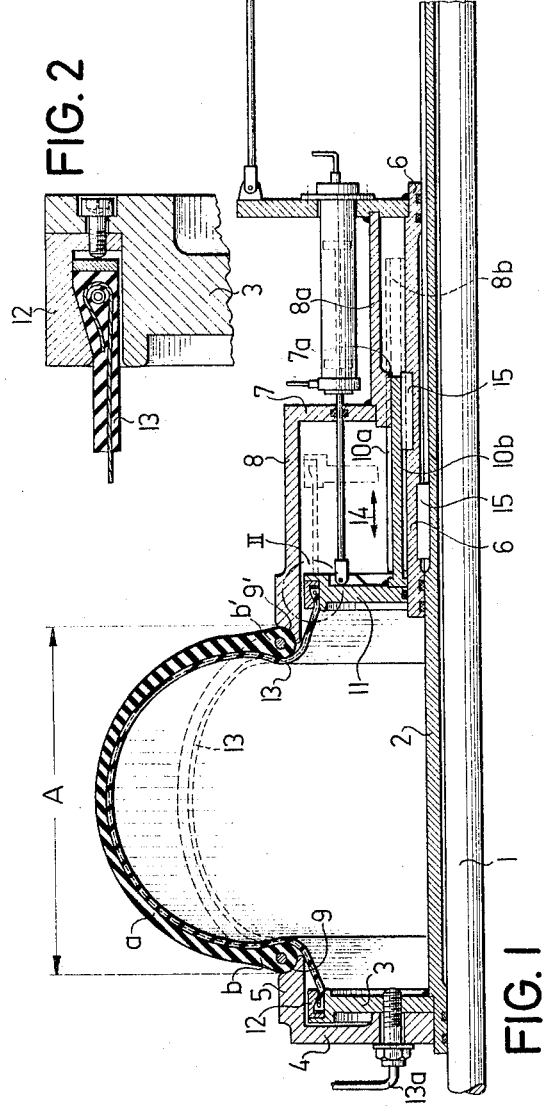
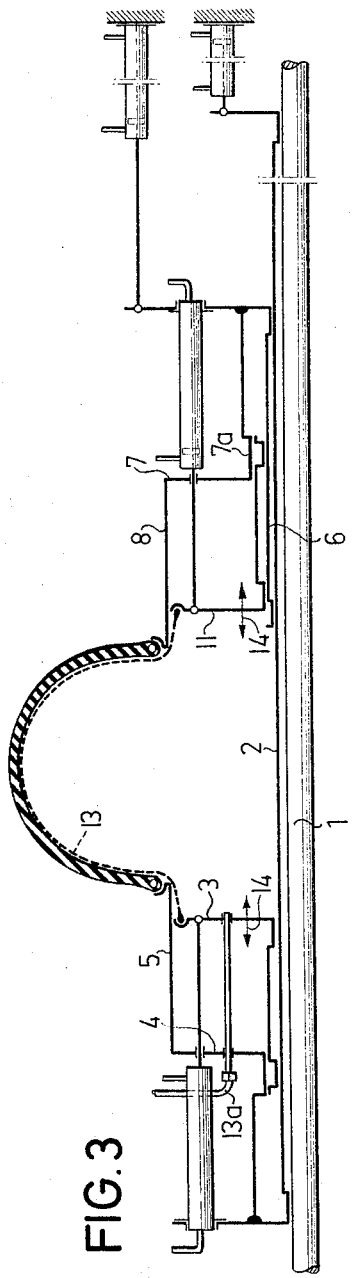
INVENTOR
Günter Johannes
BY

United States Patent Office 3,278,362
Patented Oct. 11, 1966

3,278,362
APPARATUS FOR CURVING A BUILT-UP TIRE BODY TO SHAPE
Günter Johannes, Hannover-Herrenhausen, Germany, assignor to Continental Gummi-Werke Aktiengesellschaft, Hannover, Germany
Filed Sept. 28, 1964, Ser. No. 399,736
Claims priority, application Germany, Sept. 28, 1963, C 31,007
3 Claims. (Cl. 156—415)

The present invention relates to an apparatus for curving a built-up tire body to shape, and, more specifically, concerns an apparatus for the curving of tire bodies built up in conformity with the so-called hollow cylindrical flat band method.

Apparatuses of the above mentioned type are equipped with holding means which are axially adjustable relative to each other and are adapted to hold the tire beads on the tire body. Furthermore, devices of this type are equipped with a flexible inflatable elastic tubular member which has its marginal portions clamped into clamping means and which is adapted to act upon the tire body from the inside so as to curve the same to shape.

With heretofore known devices of the above mentioned type, the clamping means for the marginal portions of the elastic flexible inflatable body, and the holding means for holding the tire beads are fixedly connected to each other. When pneumatic tire bodies are clamped in and curved by devices of the just mentioned type, the magnitude of the curving and shape of the tire body will be dependent on the respective axial length of the flexible inflatable body, and on the distance between the holding means for the tire beads. If it is intended by devices of this type to shape pneumatic tires of different sizes, it is necessary to exchange the flexible inflatable body for an inflatable body which has a smaller or larger axial extension. This exchange operation requires relatively considerable time.

It is, therefore, an object of the present invention to provide an apparatus for curving bead-equipped tire bodies, which will overcome the above mentioned drawbacks.

It is another object of this invention to provide an apparatus for curving bead-equipped tire bodies which may be used for producing tires of different sizes without the necessity of exchanging the elastic inflatable body employed for the curving of the tire body.

It is still another object of this invention to provide an apparatus as set forth in the preceding paragraph which will make it possible to vary the effective length of the flexible inflatable body used for curving the tire body.

These and other objects and advantages of the invention will appear more clearly from following specification in connection with the accompanying drawing in which:
FIG. 1 illustrates a section through a portion of an apparatus according to the invention for curving a raw carcass to produce a belted tire. FIG. 2 shows the portion in dot-dash circle II of FIG. 1, but on a larger scale than in FIG. 1. FIG. 3 illustrates an apparatus similar to that of FIG. 1 but differing therefrom in that it comprises two oppositely adjustable clamping means for varying the axial spacing of said clamping means which hold the ends of the flexible inflatable body.

An apparatus according to the present invention for curving a built-up bead-equipped tire body, which includes a spaced holding means axially adjustable relative to each other and operable to hold a bead-equipped built-up tire body therebetween at the beads thereof, and which also includes two spaced clamping means substantially co-axially arranged with regard to said holding means, is characterized primarily in that at least one of the clamping means which holds an annular elastic inflatable body for engagement with and curving the tire body, is axially adjustable relative to the respective adjacent holding means.

Referring more specifically to the drawing, the arrangement shown therein comprises a centrally arranged shaft 1 having journalled thereon a tube 2 the free end of which is provided with a disc 3. Connected to tube 2 and disc 3 for instance by screws, is an annular member 4 the outer circumferential portion of which has a flange 5 surrounding disc 3. Flange 5 has its free end provided with concave surface means 9 for engagement with and holding the bead portion $b$ of the raw tire body to be shaped and curved.

Also journalled on tube 2 is a further tube 6. Tube 6 supports a hollow cylinder 10 with an end disc 11. The outer circumference of discs 3 and 11 is each provided with clamping means 12 (see also FIG. 2) for respectively clamping therebetween the marginal portions of an inflatable tensioning and curving body 13 of elastic expandable material as for instance rubber. Said body 13 which may also be called a diaphragm is in a manner known per se provided with reinforcing inserts and is highly flexible.

Arranged on said hollow cylinder 10 is a cage 7 with a hollow cylindrical section 8 and with a concave surface 9' for supporting and holding the other bead $b'$.

In conformity with the present invention, hollow cylinder 10 is adapted on tube 6 to be displaced in the direction of the double arrow 14 relative to tube 6, for instance manually or by a fluid operable cylinder piston system, whereby the distance of the clamping means 12 relative to the respective adjacent supporting surface 9 may be varied. Therefore, it is possible, for instance to adjust hollow cylinder 10 so that it will occupy the position shown in the drawing by dash-lines. In this way, it is possible, at a certain distance between the two supporting surfaces 9, 9'—which distance has been indicated by the character A—to vary the effective length or working portion of the flexible inflatable body 13, i.e. that length of body 13 which is located between the holding surfaces 9, 9'.

It will be appreciated that cylinder 10 is displaceable relative to cage 7, for instance manually or by a fluid operable cylinder piston system, while cylinder 10 is prevented from rotating relative to cage 7. To this end, cage 7 has inner key-like protrusion means 7a slidably engaging corresponding groove means 10a in cylinder 10. On the other hand, the hub portion 8a of cage 7 is provided with an annular recess 8b to permit a withdrawal of cylinder 10 into said hub portion.

For purposes of preventing hollow cylinder 10 from rotating relative to tube 6, there is provided a key 15 which is mounted in tube 6 and engages a longitudinal groove 10b in cylinder 10.

Operation

When intending to use the apparatus according to the present invention, first discs 3 and 11 are spaced from each other to such an extent that the flexible inflatable body 13 assumes a substantially hollow cylindrical shape. Thereupon, the annular member 4 and cage 7 are spaced from each other so that the raw tire $a$ which is in its unshaped form likewise forms a hollow cylindrical body, can be supported at its beads $b$, $b'$ by the concave surfaces 9, 9'. Thereupon, a pressure fluid as for instance compressed air is introduced for instance through a connection 13a into the chamber formed by tube 2, discs 3 and 11 and flexible expandable body 13. At the same time, the distance between the surfaces 9 and 9' is reduced by a movement of tube 6 relative to tube 2. The drawing shows the maximum curvature which the raw tire body *a* undergoes during its curving operation. This maximum curvature can be varied by the adjustability of hollow cylinder 10 relative to cage 7 in conformity with the position of the elements indicated by dash lines. It will thus be evident that the apparatus according to the present invention is able to produce tires of different curvature and sizes without the necessity of exchanging the flexible inflatable body 13 provided that the bead diameter of the various sizes is approximately the same.

It is, of course, to be understood that arresting means are provided which arrest the hollow cylinder 10 relative to tube 6 and/or cage 7 to maintain the respective adjusted relative position of disc 11 with regard to cage 7.

The apparatus of FIG. 3 corresponds in construction and operation generally to that of FIG. 2, the difference being that in FIG. 3 walls 3 and 4 are adjustable similar to walls 7 and 11 of FIG. 2 whereas in FIG. 2 walls 3 and 4 are stationary.

It is also to be understood that the present invention is, by no means, limited to the particular construction shown in the drawing but also comprises any modifications within the scope of the appended claims.

What I claim is:

1. An apparatus for curving a built-up bead-equipped tire body, which includes: spaced holding means axially adjustable relative to each other and operable to hold a bead-equipped built-up tire body therebetween at the beads thereof, two spaced clamping means arranged within and substantially coaxially with regard to said holding means, an annular elastic inflatable body having its marginal portions held firmly clamped by said clamping means and together therewith forming a part of a chamber adapted to receive pressure fluid for radially outwardly expanding said elastic inflatable body for engagement with and curving said tire body, said clamping means being axially movable relative to each other while said holding means maintain their respective positions to vary the working portion of said annular elastic inflatable body.

2. An apparatus for curving a built-up bead-equipped tire body to shape, which includes: an annular expandable elastic inflatable body, clamping means including two annular means arranged in axially spaced relationship to each other and in substantially axial alignment with each other and operable respectively to firmly grasp and hold the marginal portions of said elastic inflatable body, fluid pressure operable means respectively operatively connected to said two annular means to selectively move the same toward and away from each other, said clamping means together with said elastic inflatable body confining a portion of a chamber adapted to receive fluid under pressure for radially outwardly expanding said elastic inflatable body and, axially spaced holding means surrounding said clamping means and being substantially coaxially arranged with regard to said clamping means and being axially movable relative to each other for varying the distance therebetween, said holding means being operable to receive and hold therebetween the beads of the tire body to be shaped so as to cause said tire body to surround said elastic member and to be curved by the latter, at least one of said two annular means being adjustable in axial direction thereof relative to the respective adjacent holding means while the latter remain in their respective positions to vary the working portion of said inflatable body.

3. An apparatus according to claim 2, in which said holding means have those surface areas thereof which are intended to engage the beads of the tire to be curved shaped in a concave manner.

References Cited by the Examiner
UNITED STATES PATENTS

| | | | |
|---|---|---|---|
| 2,935,117 | 5/1960 | Pfeiffer | 156—415 |
| 3,111,445 | 11/1963 | Pouilloux et al. | 156—415 X |
| 3,134,079 | 5/1964 | Gilletta et al. | 156—416 |

EARL M. BERGERT, *Primary Examiner.*

C. B. COSBY, *Assistant Examiner.*